Patented June 6, 1950

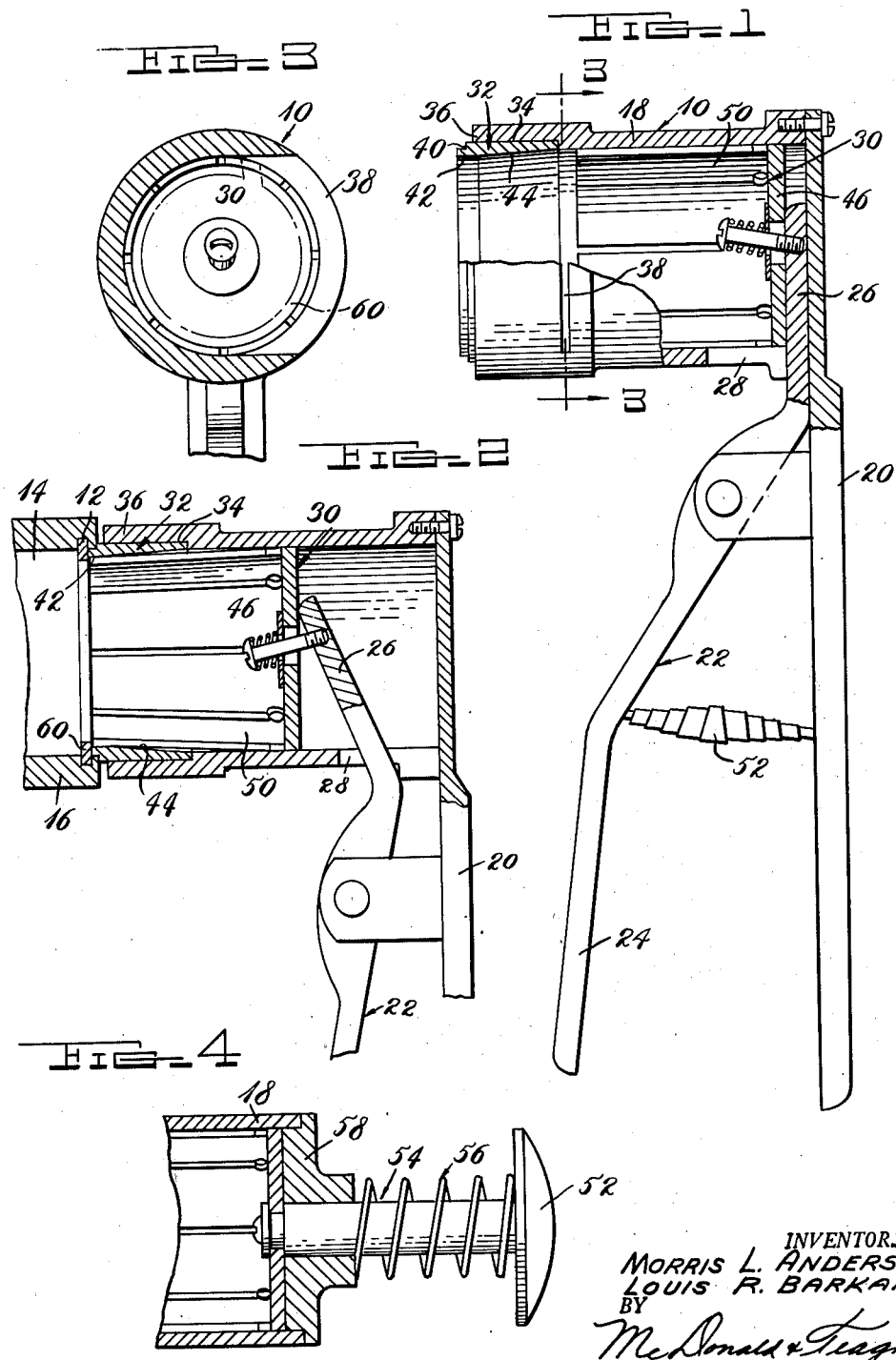

2,510,206

UNITED STATES PATENT OFFICE 2,510,206

SNAP RING TOOL

Louis R. Barkan and Morris L. Anderson, Massillon, Ohio, assignors to Eaton Manufacturing Company, Cleveland, Ohio, a corporation of Ohio Application September 18, 1947, Serial No. 774,740

3 Claims. (Cl. 29—235)

This invention relates to resilient snap rings and more particularly to a tool for assembling same upon members adapted to receive same.

Broadly the invention comprehends the provision of a tool for contracting suitably constructed resilient snap rings for application internally to appropriate members to serve as axial holding means thereon, said tool comprising means for limiting the size to which the ring is to be contracted for holding the ring uniformly circular while contracted and also for moving the ring at insertion size to its point of application. Through the controlled contraction of resilient snap rings as accomplished by this tool, it is possible to quickly, easily, and effectively assemble same where required without damage to the members upon which the rings are to be assembled.

An object of the invention is the provision of a tool for applying internal snap rings to members having counterbores and grooves therein adapted to receive said rings in assembly therein in a quick and easy manner without damage to the surface of the counterbores.

Another object of the invention is the provision of a tool for easily contracting internal type resilient snap rings to required size for assembly purposes without distorting the circular form of the ring or over contracting same.

A further object of the invention is the provision of a tool for use with an internal type resilient snap ring having means incorporated therein adapted to controllably contract the snap ring through the axial movement thereof internally of a tapered sleeve assisted with the tool to required assembly size, while at the same time restrain the ring from twisting or turning.

Other objects and advantages of the invention will appear from the following description taken in connection with the drawings forming a part of the specification; and in which:

Fig. 1 is a partially cross sectionalized side plan view of an internal snap ring assembling tool;

Fig. 2 is a fragmentary partially cross sectionalized side plan view of the assembling tool of Fig. 1 at the completion of an assembly operation.

Fig. 3 is a fragmentary view taken substantially along lines 3—3 Fig. 1 and;

Fig. 4 is a modification of the tool shown by Figs. 1 through 3.

The invention herein devised forms a counterpart of our co-pending U. S. application Ser. No. 759,822 filed July 9, 1947 pertaining to a tool for applying external snap rings.

The present tool for applying resilient snaps to internal grooves associated with counterbored members comprises a hollow cylindrical body member into which the rings are deposited in free non-contracted state, a lever operated axially movable member for moving the ring axially within the cylindrical member, and an internally tapered member affixed internally of the cylinder through which the rings are passed and contracted to insertion size said tapered member having a shoulder portion of predetermined size established relative to the axial extent to which the ring or rings have to be moved beyond the edge of the bore with which the internal grooves are associated permitting of ease in slipping the contracted rings into thin grooves. The axial length of the shoulder on the tapered portion is, predeterminedly made to coincide with the axial location of the groove from the end of the bore in which the snap ring is to be received such that the tapered member is made to satisfy solely one structural arrangement. The portion of the member incorporating the shoulder is adapted to closely fit the bore incorporating the snap ring groove with the shoulder abutting the end of the bored member and the end axial extremities of the portion of the tapered member received in the bore in radial alignment with the front wall of the groove.

Referring to the drawings for more specific details of the invention 10 represents generally a tool for contracting a snap ring of conventional construction for applying the ring in appropriate internal grooves such as groove 12 associated with the bore 14 of a bored member 16 shown by Fig. 2.

The tool 10 comprises a hollow cylindrical body member 18, a combination end cover plate and handle 20 fixedly secured to the cylindrical body substantially perpendicular to the axis of the body, a lever 22, pivoted upon the handle having a hand gripping arm 24 and an arm 26 pivotally movable in an axial direction within the cylindrical body through an axial opening or slot 28 formed in the wall of the body, a hollow cylindrical member 30 arranged in the cylindrical body frictionally mounted upon the extremity of the arm 26 of the lever 22 for axial movement in the hollow of the cylindrical body upon movement of arm 26, and an internally tapered hollow cylindrical member or sleeve 32 press fitted or otherwise suitably secured in a recess 34 in the open end 36 of the body. The body 18 is radially slotted at 38 an amount substantially equal to the internal diameter of the body 18 and is adapted to receive a snap ring for entry into the hollow of the cylindrical body preparatory to an installation of the ring in an appropriate internally grooved member.

The sleeve 32 has at one end thereof a shoulder 40 adapted to abut the end surface of a member upon which the snap ring is to be inserted and an axially extended portion 42 having an external diameter substantially equal to that of the bore of the member in which the snap ring is to be inserted. The axial length of the portion 42 is determined by the location of the groove as to its axial extent from the end of the member with which it is associated.

The sleeve 32 in being fitted in the recess 34 of the body member is so constructed and arranged that the large dimension on the taper 44 thereof is equal to the internal diameter of the body and juxtaposedly coincides therewith, the purpose of which will hereinafter appear.

The member 30 is cup shaped and comprises a bottom portion, 46 mounted upon the arms 26 by a resilient connection 48 and a plurality of axially extended resilient fingers 50 formed integrally with portion 46 and fitted in bearing relation with the internal axial wall of the cylindrical body.

The slot 38 is formed in the body arranged in a plane perpendicular to the axis of the body axially intermediate the large tapered portion of sleeve 32 and the axial extremity of the fingers 50 when in a normal, retracted position as shown by Fig. 1.

The lever arm 24 is normally resiliently biased from the handle 20 by a compression spring 52 acting to effectively hold the sleeve 32 in retracted position.

Fig. 4 illustrates a modification of the structure shown by Figs. 1, 2, and 3, wherein instead of the handle-lever arrangement 20—22 a button end 52 engageable plunger 54 arranged in axial alignment with the member 30 and fixedly secured upon the bottom thereof, said plunger being axially biased from the body member 18 by a compression spring 56 arranged intermediate an end cover plate 58 fixed to the body 18 and the button 52.

In a normal operation of the tool 10 and especially with reference to the structure shown by Figs. 1 through 3 with the tool in its normal state as shown by Fig. 1 a snap ring of conventional construction having a free state normal external diameter substantially equal to or slightly smaller than the internal diameter of the cylindrical body 18 is passed through the radial slot 38 into the bore of the body 18 and nestles loosely therein adjacent the five ends of fingers 50 of member 30. With the ring in position in the tool and a member such as member 16 in readiness to receive the snap ring in the groove 12 thereof the tool and members 18 are moved relative to one another with the axial extension 42 being received in the bore 14 and the shoulder 40 abutting the axial end or edge of member 16 and simultaneously therewith the lever 22 is pivoted upon handle 20 relative thereto resulting in actuating arm 26 and member 30 resiliently held therein axially within the bore of body 18. Upon the initial movement of the member 30 the tips of the fingers 50 engage a fan of the snap ring and as the member is further axially actuated it forces the ring into the taper 44 thus effecting a uniform contraction of the ring as it is moved along through the taper. The fingers 50 because of their resilient structure are adapted to move radially inward in engagement with the wall of the taper and thereby maintain an effective axial impinging force upon the ring as it passed through the taper.

The snap ring 60 as shown by Fig. 1 and Fig. 2 is moved through the taper by member 30 until it passes beyond the end of sleeve 32 and snaps radially outward into place in the groove 12 adapted to receive same. The tool is then retracted with the lever and member 30 resuming normal spring held positions relative to the body 18 and handle 20. This completes an operational use of the tool.

It is apparent through the equally distributed axial force imparted by the member 30 and fingers 50 thereof in the movement of the snap ring through the taper 44 and the resisting force offered by the inclined internal wall of sleeve 32 that the ring will be uniformly contracted as well as being maintained in a plane perpendicular to axis of the cylindrical body 18 and sleeve 32 so that the ring can be properly and quickly inserted in its appropriate receiving groove without any tendency to overstress or twist the ring in the assembly thereof.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. A tool for contracting a resilient snap ring comprising a hollow cylindrical body open at one end and closed at its other end, having a tapered internal wall at its open end diminishing in size toward the open end thereof and a snap ring receiving opening in the wall thereof intermediate its open and closed ends, a gripping handle securely affixed to the closed end of the body, a spring pressed lever pivotally mounted on the handle, and a radially collapsible member fitted in the closed end of the body loosely coupled to one end of the lever, said member axially and limitedly radially movable in the cylinder body past the opening in the body into sliding engagement with the tapered wall thereof.

2. A tool for contracting resilient snap rings comprising a member having a circular aperture therein for receiving the snap ring to be contracted, an internally tapered wall at one open end thereof diminishing toward the open end, a radial opening in the wall thereof through which the snap ring is inserted into the aperture, hollow cylindrical means having a plurality of axially extended circumferentially spaced resilient fingers at one end axially movable in the aperture of the member for moving the snap ring through the aperture from the large toward the diminished size of the taper and leverage means associated with the member for actuating the means axially movable in the member.

3. A tool for contracting resilient snap rings for insertion into internal grooves of bored members comprising a cylindrical member having an aperture therein a ring fixedly secured in the aperture of the cylindrical member at one axial extremity thereof having a diminishing internal taper and an external diameter at the taper end substantially equal to the internal diameter of the bored member, said externally diametered portion extending axially a distance substantially equal to the distance the groove into which the snap ring is to be inserted is axially removed from the open end of the bored member, an opening in the wall of cylindrical member through which the ring is inserted into the aperture of the member, hollow cylindrical means having a plurality of axially extended circumferentially spaced resilient fingers at one end axially movable in the aperture adopted to force the ring inserted therein through the internal taper in the ring and beyond the end thereof in an assembly of the ring into the groove adopted to receive same and means for moving the means axially in the aperture of the member.

LOUIS R. BARKAN.
MORRIS L. ANDERSON.

REFERENCES CITED

The following references are of record in the file of this patent:

UNITED STATES PATENTS

| Number | Name | Date |
|---|---|---|
| 391,760 | Norton | Oct. 23, 1888 |
| 864,226 | Blodgett | Aug. 27, 1907 |
| 1,420,507 | Waldron | June 20, 1922 |
| 2,357,139 | Seme | Aug. 29, 1944 |
| 2,438,642 | Martin | Mar. 30, 1948 |
| 2,457,930 | Smith | Jan. 4, 1949 |